United States Patent
Park et al.

(10) Patent No.: US 10,511,192 B2
(45) Date of Patent: Dec. 17, 2019

(54) WIRELESS POWER RECEIVER

(71) Applicant: Samsung Electronics Co., Ltd., Gyeonggi-do (KR)

(72) Inventors: Jae-Hyun Park, Gyeonggi-do (KR); Dong-Zo Kim, Gyeonggi-do (KR); Do-Won Kim, Gyeonggi-do (KR); Bong-Chul Kim, Seoul (KR); Sung-Ku Yeo, Gyeonggi-do (KR); Young-Ho Ryu, Gyeonggi-do (KR); Chong-Min Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 271 days.

(21) Appl. No.: 15/499,382

(22) Filed: Apr. 27, 2017

(65) Prior Publication Data

US 2017/0346342 A1  Nov. 30, 2017

(30) Foreign Application Priority Data

May 27, 2016  (KR) .................. 10-2016-0065633

(51) Int. Cl.
*H02J 50/12* (2016.01)
*H01F 38/14* (2006.01)
*H02J 7/02* (2016.01)
*H01F 27/28* (2006.01)

(52) U.S. Cl.
CPC .......... *H02J 50/12* (2016.02); *H01F 27/2804* (2013.01); *H01F 38/14* (2013.01); *H02J 7/025* (2013.01)

(58) Field of Classification Search
None
See application file for complete search history.

(56) References Cited

U.S. PATENT DOCUMENTS

| | | | | |
|---|---|---|---|---|
| 8,922,066 | B2 * | 12/2014 | Kesler | ............... B60L 53/65 307/326 |
| 2007/0222542 | A1 | 9/2007 | Joannopoulos et al. | |
| 2010/0164295 | A1 | 7/2010 | Ichikawa et al. | |

(Continued)

FOREIGN PATENT DOCUMENTS

| | | |
|---|---|---|
| EP | 2 546 998 | 1/2013 |
| EP | 2 597 782 | 5/2013 |

(Continued)

OTHER PUBLICATIONS

International Search Report dated Sep. 7, 2017 issued in counterpart application No. PCT/KR2017/005546, 11 pages.

(Continued)

*Primary Examiner* — Jared Fureman
*Assistant Examiner* — Aqeel H Bukhari
(74) *Attorney, Agent, or Firm* — The Farrell Law Firm, P.C.

(57) ABSTRACT

An electronic device is provided that includes a housing and a power receiver disposed within the housing. The power receiver includes a conductive pattern for receiving power wirelessly. The conductive pattern includes a main coil having a plurality of turns, a first sub-coil formed at an input port of the main coil, and a second sub-coil formed at an output port of the main coil. The electronic device also includes a controller configured to control to receive power using the conductive pattern.

15 Claims, 10 Drawing Sheets

(56) References Cited

U.S. PATENT DOCUMENTS

| | | | |
|---|---|---|---|
| 2012/0098486 A1 | 4/2012 | Jung | |
| 2012/0119698 A1* | 5/2012 | Karalis | B60L 11/182 320/108 |
| 2013/0119928 A1 | 5/2013 | Partovi | |
| 2013/0249302 A1 | 9/2013 | An et al. | |
| 2014/0176067 A1 | 6/2014 | Suzuki | |
| 2014/0197694 A1 | 7/2014 | Asanuma et al. | |
| 2014/0218262 A1* | 8/2014 | Tsubaki | H01Q 7/00 343/867 |
| 2015/0001950 A1 | 1/2015 | Chung et al. | |
| 2015/0255994 A1* | 9/2015 | Kesler | H02J 5/005 307/10.1 |
| 2015/0326057 A1 | 11/2015 | Koyanagi et al. | |
| 2016/0020600 A1 | 1/2016 | Mori et al. | |

FOREIGN PATENT DOCUMENTS

| | | |
|---|---|---|
| EP | 2 642 497 | 9/2013 |
| EP | 2 894 757 | 7/2015 |
| EP | 3 016 231 | 5/2016 |
| KR | 1020120082769 | 7/2012 |
| KR | 1020130072284 | 7/2013 |
| WO | WO 2015/125295 | 8/2015 |

OTHER PUBLICATIONS

European Search Report dated Apr. 5, 2019 issued in counterpart application No. 17803115.9-1202, 14 pages.
European Search Report dated Jan. 7, 2019 issued in counterpart application No. 17803115.9-1202, 13 pages.

\* cited by examiner

WIRELESS POWER RECEIVER

PRIORITY

This application claims priority under 35 U.S.C. § 119(a) to Korean Patent Application No. 10-2016-0065633, which was filed in the Korean Intellectual Property Office on May 27, 2016, the content of which is incorporated herein by reference.

BACKGROUND

1. Field of the Disclosure

The present disclosure relates generally to a wireless power receiver, and more particularly, to a wireless power receiver and method for receiving power from a transmitter.

2. Description of the Related Art

The services and functions that are available from an electronic device have become more diverse to increase the utilization of electronic devices and satisfy various user demands. For example, an electronic device can receive power wirelessly from a wireless power transmitter, and the wireless power transmitter can supply power wirelessly to electronic devices.

In general, power is wirelessly supplied to an electronic device by magnetic induction, magnetic resonance, or radio frequency (RF) propagation. The magnetic induction method is relatively efficient in a short range. The magnetic induction method is based on induction between coils, uses a frequency band of a few kiloHertz (kH), and has a transmission distance of a few centimeters. When the wireless power transmitter of and the electronic device are apart from each other by 1 millimeter (mm) or less, charging may have a power efficiency of 90%, compared to wired charging. According to the magnetic induction method, when a variable current is applied to a transmission coil, non-radiative electromagnetic waves generated in the same frequency as the applied variable current incurs an induction current in the same frequency in a reception coil, thus charging the electronic device.

The magnetic resonance method relies on resonance generated between a transmission coil and a reception coil by means of a resonance coil. In the magnetic resonance method, a frequency ranging from 1 to 20 MegaHertz (MHz) is used, and the transmission distance is generally a few meters or less. For example, the magnetic resonance method may use 6.78 MHz. Compared to wired charging, the magnetic resonance method has a power efficiency of about 70% when the electronic device is charged apart from a wireless power transmitter by a few centimeters. In the magnetic resonance method, a magnetic field generated by a variable current applied to a transmission coil of the wireless power transmitter is applied to a resonance coil by inductive coupling, and magnetic resonant coupling occurs between the resonance coil and a resonance coil of a wireless power receiver having the same resonance frequency. Inductive coupling occurs again at the reception coil, thereby charging the electronic device.

The RF propagation method supplies wireless power, relying on the radiation property between an RF transmission antenna and an RF reception antenna. A frequency of 5.8 GHz may be used. There exists short-range RF propagation having a transmission distance of a few meters or less, and long-range RF propagation having a transmission distance that is greater than a few meters. The RF propagation method has a lower transmission efficiency than the magnetic induction method and the magnetic resonance method.

However, as the size of the resonance coil increases, the conventional wireless power receiver is affected by radiation of electromagnetic waves that are generated from the coil and are unnecessary for wireless power reception.

SUMMARY

The present disclosure has been made to address at least the above problems and/or disadvantages and to provide at least the advantages described below. Accordingly, an aspect of the present disclosure provides a wireless power receiver and a wireless power reception method, for wirelessly receiving power in an electronic device.

In accordance with an aspect of the present disclosure, an electronic device is provided that includes a housing and a power receiver disposed within the housing. The power receiver includes a conductive pattern for receiving power wirelessly. The conductive pattern includes a main coil having a plurality of turns, a first sub-coil formed at an input port of the main coil, and a second sub-coil formed at an output port of the main coil. The electronic device also includes a controller configured to control to receive power using the conductive pattern.

In accordance with another aspect of the present disclosure, an electronic device is provided that includes a housing and a conductive pattern unit disposed within the housing. The conductive pattern unit includes a main coil, a first sub-coil disposed on the main coil, and a second sub-coil disposed on the main coil. The first and second sub-coils are formed to reduce radiation of electromagnetic waves in a high frequency band. The electronic device also includes controller configured to wirelessly receive power using the conductive pattern unit.

BRIEF DESCRIPTION OF THE DRAWINGS

The above and other aspects, features, and advantages of certain embodiments of the present disclosure will be more apparent from the following detailed description when taken in conjunction with the accompanying drawings, in which.

DETAILED DESCRIPTION

Figure 1:
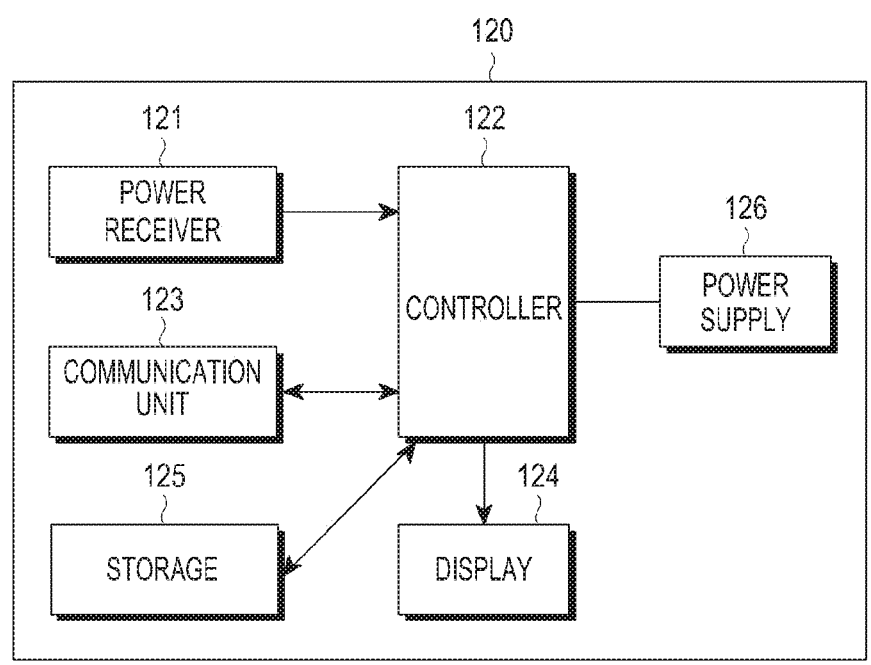
FIG. 1 is a block diagram illustrating a wireless power receiver, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Herein, the terms "have", "may have", "include", and "may include" signify the presence of a specific feature (for example, a number, a function, an operation, or a component such as a part), not excluding the presence of one or more other features.

Herein, the terms "A or B", "at least one of A or/and B", or "one or more of A or/and B" may cover all possible combinations of enumerated items. For example, "A or B", "at least one of A and B", or "at least one of A or B" may represent the inclusion of at least one A, the inclusion of at least one B, and the inclusion of at least one A and at least one B.

As used herein, the terms "first" and "second" may modify the names of various components irrespective of their sequence and/or importance, not limiting the components. These expressions are used to distinguish one component from another component. For example, a first user equipment (UE) and a second UE may indicate different UEs irrespective of sequence or importance. Additionally, a first component may be referred to as a second component and vice versa without departing the scope of the present disclosure.

When a component (for example, a first component) is described as being "operatively or communicatively coupled with/to" or "connected to" another component (for example, a second component), it should be understood that the one component is connected to the other component directly or through any other component (for example, a third component). However, when it is described that a component (for example, the first component) is "directly connected to" or "directly coupled to" another component (for example, the second component), it may be understood that there is no other component (for example, the third component) between the components.

The term "configured to", as used herein, may be used interchangeably with, for example, the term "suitable for", "having the capacity to", "designed to", "adapted to", "made to", or "capable of". The term "configured to" may not necessarily mean "specifically designed to" in hardware. For example, "a processor configured to execute A, B, and C" may mean a dedicated processor (for example, an embedded processor) for performing the corresponding operations, or a generic-purpose processor (for example, a central processing unit (CPU) or an application processor (AP)) for performing the operations.

The terms used herein are provided to describe embodiments, and are not intended to limit the scope of other embodiments. It is to be understood that singular forms include plural referents unless the context clearly dictates otherwise. Unless otherwise defined, the terms and words, including technical or scientific terms, used herein, may have the same meanings as those generally understood by those skilled in the art. Terms that are generally defined in dictionaries may be interpreted as having the same or similar meanings as contextual meanings of related technology. Unless otherwise defined, the terms should not be interpreted in an ideally or excessively formal manner. The terms, as defined herein, may not be interpreted as excluding embodiments of the present disclosure.

An electronic device, according to embodiments of the present disclosure, may be embodied as at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical equipment, a camera, or a wearable device. The wearable device may be embodied as at least one of an accessory type (for example, a watch, a ring, a bracelet, an ankle bracelet, a necklace, glasses, contact lenses, or a head-mounted device (HIVID)), a fabric or clothes type (for example, electronic clothes), a body-attached type (for example, a skin pad or a tattoo), or an implantable type (for example, an implantable circuit).

According to embodiments of the present disclosure, an electronic device may be embodied as a home appliance. For example, the home appliance may be at least one of, a television (TV), a digital versatile disc (DVD) player, an audio player, a refrigerator, an air conditioner, a vacuum cleaner, an oven, a microwave oven, a washer, an air purifier, a set-top box, a home automation control panel, a security control panel, a TV box, a game console, an electronic dictionary, an electronic key, a camcorder, a charger, or an electronic picture frame.

According to other embodiments of the present disclosure, an electronic device may be embodied as at least one of a medical device (for example, a portable medical meter such as a blood glucose meter, a heart rate meter, a blood pressure meter, or a body temperature meter, a magnetic resonance angiography (MRA) device, a magnetic resonance imaging (MM) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (for example, a naval navigation device, a gyrocompass, or the like), an avionic electronic device, a security device, an in-vehicle head unit, an industrial or consumer robot, an automated teller machine (ATM) in a financial facility, a point of sales (POS) device in a shop, or an Internet of Things (IoT) device (for example, a light bulb, various sensors, an electricity or gas meter, a sprinkler, a fire alarm, a thermostat, a street lamp, a toaster, sports goods, a hot water tank, a heater, or a boiler).

According to embodiments of the present disclosure, an electronic device may be embodied as at least one of furniture, part of a building/structure, an electronic board, an electronic signature receiving device, a projector, and various measuring devices (for example, water, electricity, gas or electro-magnetic wave measuring devices). An electronic device may be one or a combination of two or more of the foregoing devices. An electronic device may be a flexible electronic device. In addition, it will be apparent to one having ordinary skill in the art that an electronic device is not limited to the foregoing devices and covers a new electronic device produced along with new technology development.

Herein, the term "user" may refer to a person or device (for example, an artificial intelligence electronic device) that uses an electronic device.

FIG. 1 is a block diagram illustrating a wireless power receiver, according to an embodiment of the present disclosure.

Referring to FIG. 1, a wireless power receiver 120 includes a power receiver 121, a controller 122, a communication unit 123, a display 124, a storage 125, and a power supply 126.

The power receiver 121 may receive power wirelessly from a wireless power transmitter). The power receiver 121 may receive power in the form of alternating current (AC) waves. The power receiver 121 may include at least one coil for receiving power wirelessly, and a control circuit for controlling power reception through the coil. The power supply 126 may be charged with the received power under the control of the controller 122.

The storage 125 may include a volatile memory and a non-volatile memory. The storage 125 may, for example, store commands or data related to control and operations of the components of the wireless power receiver 120. The storage 125 may store software and programs. The programs may include, for example, a kernel, middleware, an application programming interface (API), and/or an application program (or application). At least part of the kernel, the middleware, or the API may be referred to as an operating system (OS).

The display 124 may include, for example, a liquid crystal display (LCD), a light emitting diode (LED) display, an organic LED (OLED) display, a microelectromechanical systems (MEMS) display, or an electronic paper display. The display 124 may display, for example, various types of content (for example, text, an image, a video, an icon, or a symbol) to a user. The display 124 may include a touch screen and receive, for example, a touch input, a gesture input, a proximity input, or a hovering input through an electronic pen or a user's body part.

The controller 122 may include one or more of a CPU, an AP, or a communication processor (CP). The controller 122 may, for example, execute computation or data processing related to control and communication of at least one other component of the wireless power receiver 120.

The controller 122 may provide the overall control of the wireless power receiver 120. The controller 122 may control overall operations of the wireless power receiver 120 using an algorithm, program, or application required for control, that is read from the storage 125. The controller 122 may be implemented as a CPU, a microprocessor, or a mini computer.

The communication unit 123 may include, for example, a cellular module, a wireless fidelity (WiFi) module, a Bluetooth module, a global navigation satellite system GNSS module (for example, a global positioning system (GPS) module, a Glonass module, a Beidou module, or a Galileo), a near field communication (NFC) module, and/or a radio frequency (RF) module. The communication unit 123 may conduct communication with the wireless power transmitter in a predetermined scheme. The communication unit 123 may receive, from the controller 122, a charging control signal for controlling a charging function of the wireless power receiver 120, and transmit the charging control signal to the wireless power transmitter. The charging control signal may be a control signal that enables or disables the charging function by controlling the power receiver 121 of the wireless power receiver 120. As described in greater detail below, power information may include information about the insertion of a wired charging port, switching from a stand-alone (SA) mode to a non-stand-alone (NSA) mode, release from an error state, or the like. Also, the charging control signal may include information related to a determination of cross connection, according to an embodiment of the present disclosure. For example, the charging control signal may include identification information, setting information, and the like for determining the cross connection, and may include information about a pattern or time related to a load change of the wireless power receiver 120, for determining the cross connection.

The controller 122 may control the display 124 to display a state of the wireless power receiver 120. Further, the controller 122 may display an expected time until the wireless power receiver 120 is fully charged.

Figure 2:
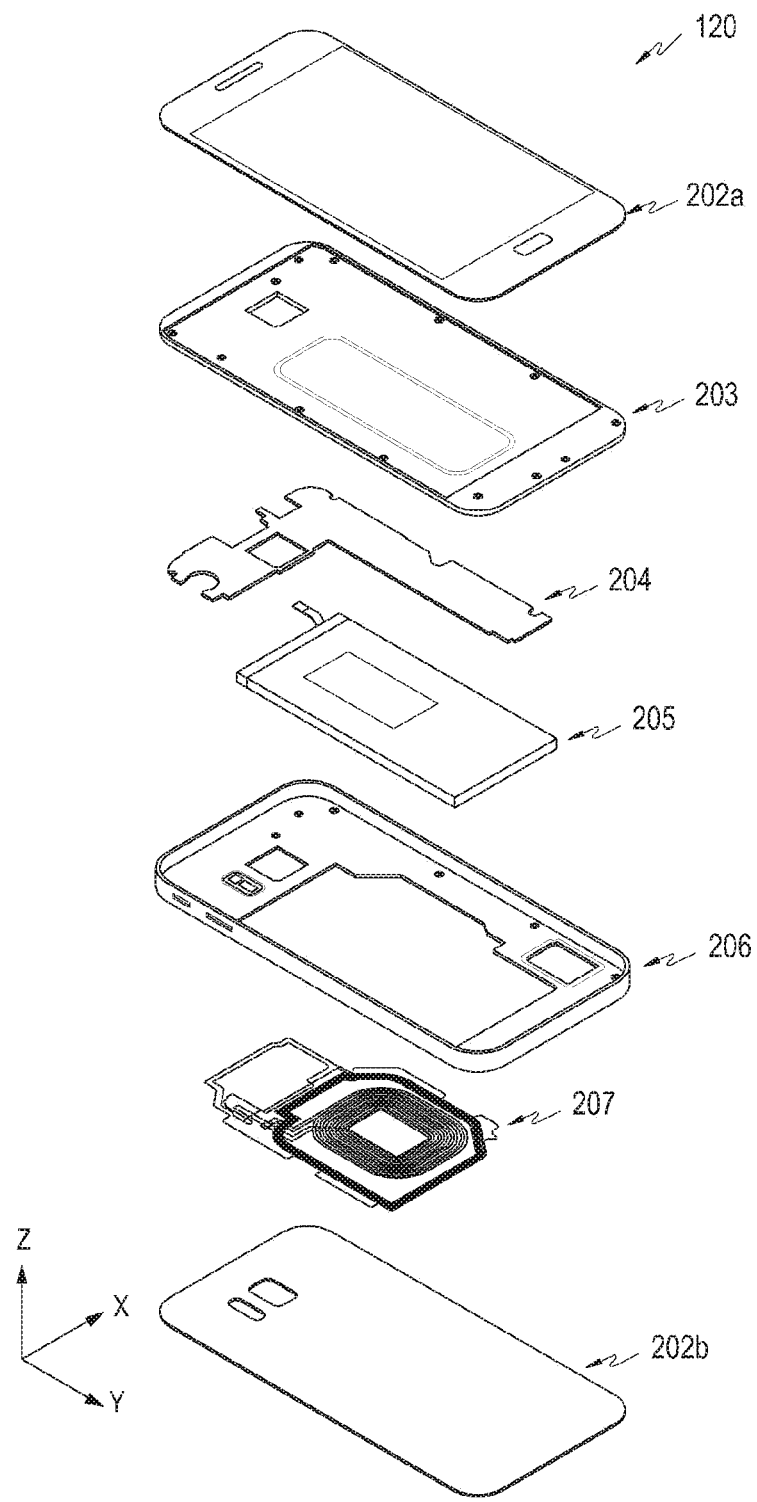
FIG. 2 is a diagram illustrating an exploded perspective view of a wireless power receiver, according to an embodiment of the present disclosure.

FIG. 2 is a diagram illustrating an exploded perspective view of a wireless power receiver, according to an embodiment of the present disclosure.

Referring to FIG. 2, in a 3-axis orthogonal coordinate system, an X-axis direction represents a width direction of the wireless power receiver 120, a Y-axis direction represent a length direction of the wireless power receiver 120, and a Z-axis direction represents a depth direction of the wireless power receiver 120.

The wireless power receiver 120 includes a housing 206, plates 202a and 202b, a conductive pattern unit 207, and a control circuit connected to the conductive pattern unit 207. The conductive pattern unit 207 may be configured in the power receiver 121.

According to embodiments of the present disclosure, the housing 206 is provided to accommodate various electronic parts and the like, and at least part of the housing 206 may be formed of a conductive material. For example, the housing 206 may include sidewalls that form outer side surfaces of the wireless power receiver 120, and an exposed part of the wireless power receiver 120 may be fabricated of a conductive metal. A circuit board 204 and a battery 205 are accommodated inside the housing 206. For example, the controller 122, the power receiver 121, the communication unit 123, and the like, as illustrated in FIG. 1, may be mounted in the form of an integrated circuit (IC) chip on the circuit board 204. Also, the circuit board 204 may be mounted in the housing 206.

According to embodiments of the present disclosure, the plates 202a and 202b may be fabricated, at least partially, of a material that transmits radio waves or a magnetic field. The plates may be embodied as a front cover 202a mounted on a front surface of the housing 206, and a rear cover 202b mounted on a rear surface of the housing 206. The front cover 202a may include, for example, a display device. For example, the front cover 202a may include the display 124 including a window member of tempered glass and the display device mounted on an inner surface of the window member. A touch panel may be mounted between the window member and the display device. For example, the front cover 202b may be equipped with a touch screen function, and thus, used as an input device, while also serving as an output device. The rear cover 202b may be mounted facing a direction opposite that of the front cover 202a, and may be fabricated of a material capable transmitting radio waves or a magnetic field, for example, tempered glass or synthetic resin. The front cover 202a and the rear cover 202b may be mounted in the housing 206, thus forming the exterior of the wireless power receiver 120 along with the housing 206.

According to embodiments of the present disclosure, a support member 203 is mounted in the housing 206. The support member 203 may be fabricated of a metal material, and is arranged in a space formed by the housing 206 and the front cover 202a. For example, the support member 203 may be interposed between the display 124 and the circuit board 204. The support member 203 may prevent the IC chips mounted on the circuit board 204 from contacting the display 124, and may prevent electromagnetic interference between the IC chips by providing an electromagnetic shielding function. The support member 203 may reinforce the strength of the wireless power receiver 120. For example, a plurality of openings or recesses may be formed in the housing 206 according to the arrangement of electronic parts inside the wireless power receiver 120, thus decreasing the strength of the housing 206 or the wireless power receiver 120. The support member 203 may increase the strength of the housing 206 or the wireless power receiver 120.

While not shown, various structures may be formed on surfaces of the housing 206 and the support member 203 according to the arrangement of the electronic parts inside the wireless power receiver 120 or an engagement structure between the housing 206 and the support member 203. For example, a space for accommodating the IC chips mounted on the circuit board 204 may be formed in each of the housing 206 and/or the support member. The space for accommodating the IC chips may be formed in the shape of a recess or a rib surrounding the IC chips. According to embodiments of the present disclosure, engagement bosses or engagement holes corresponding to each other may be formed in the hosing 206 and the support member 203. For example, the housing 206 and the support member 203 may be engaged and facing each other, or the support member 203 may be engaged in the housing 206 by engaging an engagement member such as a screw with an engagement member or an engagement hole.

According to embodiments of the present disclosure, the conductive pattern unit 207 may be mounted on a surface of the housing 206 in a direction opposite that of the circuit board 204. For example, the conductive pattern unit 207 may be positioned in a space formed by the rear cover 202b and the housing 206. The conductive pattern unit 207 may include at least one conductive pattern, for example, a planar coil, and may receive power wirelessly through the planar coil. The conductive pattern unit 207 is described in greater detail below with reference to FIGS. 3A and 3B.

According to embodiments of the present disclosure, wireless power received through the conductive pattern unit 207 may be transmitted through a plate, for example, the rear cover 202b. The rear cover 202b may be fabricated of tempered glass or synthetic resin. If the rear cover 202b is fabricated of a transparent material such as tempered glass, a paint layer may be formed on the inner surface or the outer surface of the rear cover 202b to thereby hide structures or electronic parts (for example, the conductive pattern unit 207) inside the rear cover 202b.

Figure 3A:
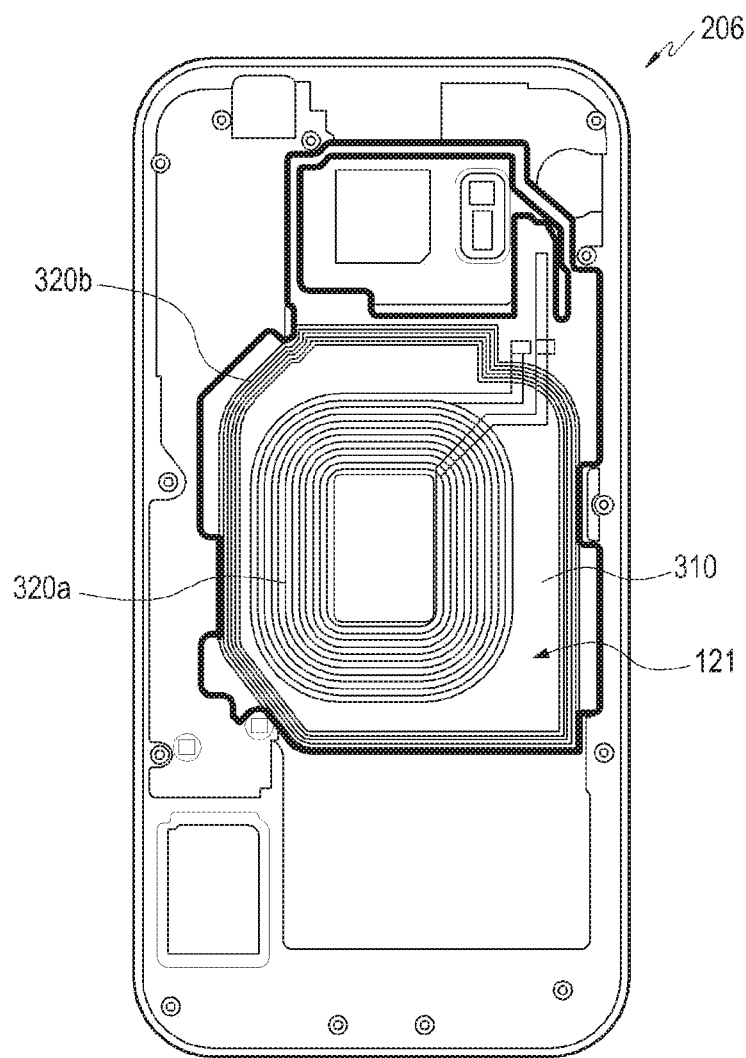
FIG. 3A is a diagram illustrating a plan view of a conductive pattern unit of a wireless power receiver installed in a housing, according to an embodiment of the present disclosure.
Figure 3B:
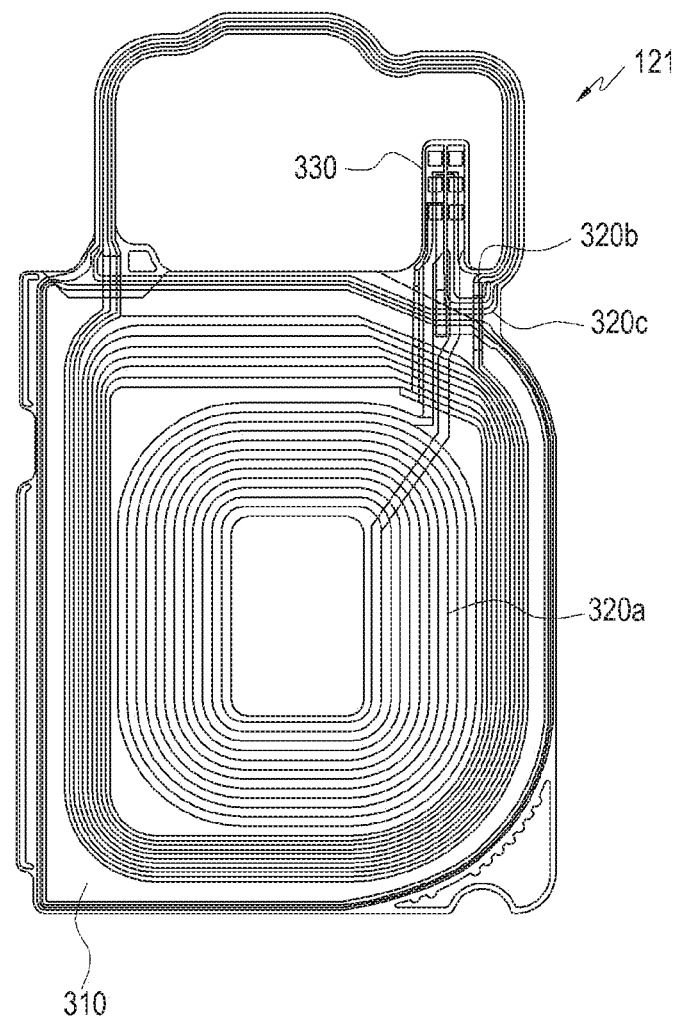
FIG. 3B is a diagram illustrating a plan view of a conductive pattern unit of a wireless power receiver, according to an embodiment of the present disclosure.

FIG. 3A is a diagram illustrating a plan view showing the conductive pattern unit of the wireless power receiver installed in the housing, according to an embodiment of the present disclosure. FIG. 3B is a diagram illustrating a plan view showing the conductive pattern unit of the wireless power receiver, according to an embodiment of the present disclosure.

Referring to FIGS. 3A and 3B, the conductive pattern unit 207 includes a base member 310 and conductive patterns 320a, 320b, and 320c. The conductive patterns 320a, 320b, and 320c may be included in the power receiver 121 of FIG. 1.

According to embodiments of the present disclosure, the base member 310 may include a film fabricated of an insulator or a dielectric material, and may provide an area in which the conductive patterns 320a, 320b, and 320c are formed. For example, the conductive pattern unit 207 may be formed in the shape of a flexible printed circuit board (FPCB). Or the conductive pattern unit 207 may be configured as an FPCB having a multi-layer circuit board structure. For example, the conductive patterns 320a, 320b, and 320c may be arranged on one surface or the other surface of the base member 310. If the base member 310 has a multi-layer circuit board structure, the conductive patterns 320a, 320b, and 320c may be formed on an appropriate layer from among the layers of the base member 310. For example, the conductive patterns 320a, 320b, and 320c may be formed by etching (for example, wet-etching or dry-etching) a part of a conductive layer formed on the base member 310 through conductive ink-based printing, deposition, painting, or plaiting. The base member 310 includes a connection piece 330. The connection piece 330 may connect the conductive patterns 320a, 320b, and 320c to another component. For example, one end of each of the conductive patterns 320a, 320b, and 320c may be positioned on the connection piece 330 and connected to another component by means of a connection member such as a connector, a pogo pin, or a C-clip.

According to embodiments of the present disclosure, the conductive patterns 320a, 320b, and 320c may form a loop antenna. If the loop antenna is shaped into an FPCB, a plurality of communication loop antennas may be included on a single FPCB.

According to embodiments of the present disclosure, an antenna formed into a single FPCB may include a loop antenna for NFC, magnetic secure transfer (MST), or wireless communication. For example, if both the front and rear surfaces of the wireless power receiver 120 are formed of glass, the FPCB may be interposed between the rear glass and an inner housing of a terminal (for example, the housing 206). For example, at least part of the inner housing may include a non-conductive material (for example, plastic injection). Additionally, at least part of the inner housing may include an opening. At least part of the FPCB antenna may overlap with a battery. This FPCB antenna may further include a thermal sheet (for example, a graphite sheet) and a shielding material (for example, ferrite).

According to embodiments of the present disclosure, each of the conductive patterns 320a, 320b, and 320c may receive radio waves or wireless power. The conductive patterns 320a, 320b, and 320c are formed on the base member 310. The first conductive pattern 320a is surrounded by the second or third conductive pattern 320b or 320c. At least one of the conductive patterns 320a, 320b, and 320c may include a plurality of turns in which a conductive line is wound in the form of a circle or a polygon. If the base member 310 is mounted in the housing 206, the base member 310 may be disposed substantially in parallel with the housing 206 or a plate (for example, the rear cover 202b). The first conductive pattern 320a may be used for NFC. The wireless power receiver 120 may transmit and receive data by contactless short-range wireless communication based on the first conductive pattern 320a. The second conductive pattern 320b may be used for MTS communication. The wireless power receiver 120 may transmit payment information to a card reader based on the second conductive pattern 320b. The third conductive pattern 320c may be a resonance coil and may receive power wirelessly from a wireless power transmitter. The position of each conductive pattern may be changed according to design and structural readiness. Each of the conductive patterns 320a, 320b, and 320c may be shaped into a closed loop. The conductive patterns 320a, 320b, and 320c may be arranged near each other, one conductive pattern may surround the other one or two conductive patterns, or the conductive patterns 320a, 320b, and 320c may be arranged without at least partial overlap. The third conductive pattern 320c may be disposed at an outermost portion in order to increase a wireless power reception rate.

Figure 4A:
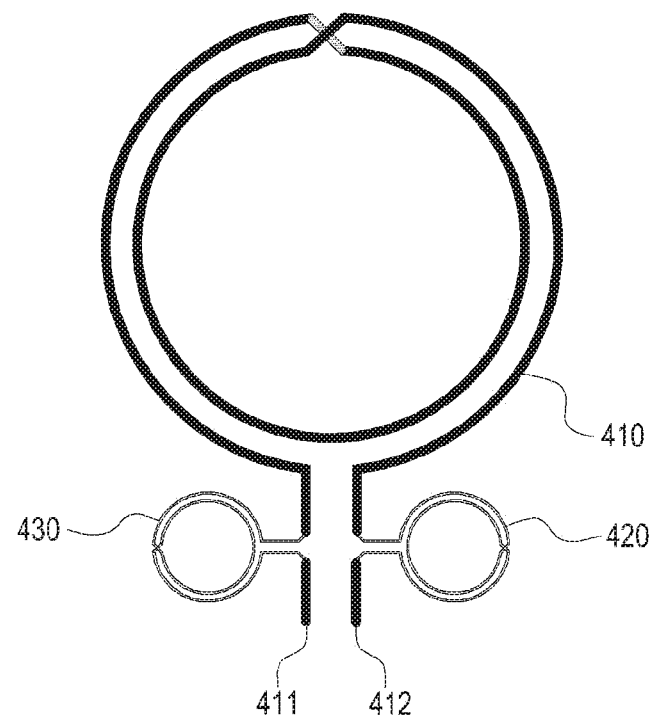
FIG. 4A is a diagram illustrating a conductive pattern, according to an embodiment of the present disclosure.
Figure 4B:
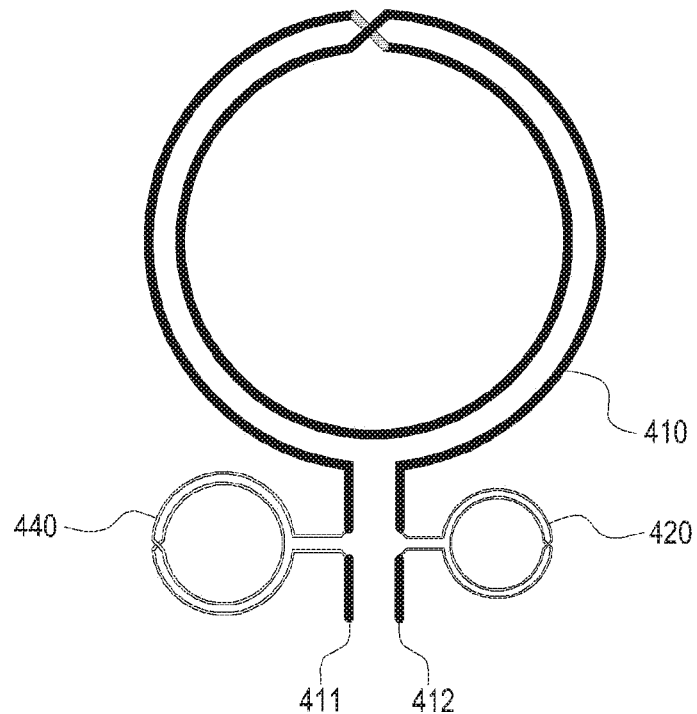
FIG. 4B is a diagram illustrating a conductive pattern, according to another embodiment of the present disclosure.
Figure 4C:
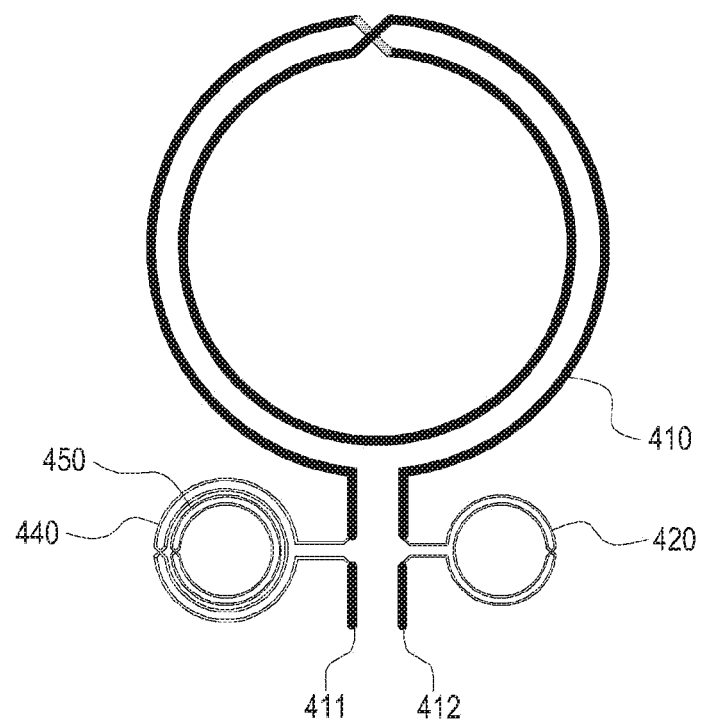
FIG. 4C is a diagram illustrating a conductive pattern, according to another embodiment of the present disclosure.

FIG. 4A is a diagram illustrating a conductive pattern, according to an embodiment of the present disclosure. FIG. 4B is a diagram illustrating a conductive pattern, according to another embodiment of the present disclosure. FIG. 4C is a diagram illustrating a conductive pattern, according to another embodiment of the present disclosure.

According to embodiments of the present disclosure, a conductive pattern may be included in the power receiver 121 of the wireless power receiver 120. A matching circuit, a lumped element, a switch device, or the like, is disposed on each coil included in the conductive pattern so that the resonance frequency or magnetic flux distribution of the coil may be controlled. A resonant unit including the conductive pattern may be disposed in a space formed by the rear cover 202b and the housing 206. The resonant unit may include at least a conductive pattern, for example, a planar coil, and may receive power wirelessly through the planar coil. The wireless power received through the conductive pattern may be transmitted through a plate, for example, the rear cover 202b. The conductive pattern may be formed by etching (for example, wet-etching or dry-etching) a part of a conductive layer formed on the base member 310 through conductive ink-based printing, deposition, painting, and/or plaiting. The conductive pattern may form a loop antenna. If the loop antenna is shaped into an FPCB, a plurality of communication loop antennas may be included on a single FPCB.

Referring to FIGS. 4A, 4B, and 4C, a conductive pattern includes a main coil 410 formed into a plurality of turns, and two sub-coils 430 and 420 formed at an input port 411 and an output port, respectively, of the main coil 410. The two sub-coils 430 and 420 may be added to the input port 411 and the output port 412 of the main coil 410 in order to reduce radiation of electromagnetic waves in a high frequency band. The two sub-coils 430 and 420 may be added to the input port 411 and the output port 412 of the main coil 410 in order to prevent a signal generated from a rectifier from affecting the main coil 410. Since impedance of the two sub-coils 430 and 420 increases significantly in a specific band, the sub-coils 430 and 420 may prevent the signal from affecting the main coil 410.

The two sub-coils 430 and 420 have a resonance frequency that is the same as or similar to a resonance frequency measured by disposing the main coil 410. In general, although a coil (for example, the main coil) used in a resonance scheme does not radiate electromagnetic waves at 6.78 MHz, it generally radiates electromagnetic waves at or above 100 MHz. On the other hand, a sub-coil that is smaller than the coil (for example, the main coil) does not generally radiate electromagnetic waves at a specific frequency that is greater than or equal to or 100 MHz. Accordingly, a sub-coil, having a resonance frequency corresponding to a resonance frequency in which electromagnetic waves are radiated, is attached to the main coil, thereby reducing electromagnetic waves generated during conversion of AC power received at the main coil to direct current (DC) power. These two sub-coils 430 and 420 may be serially connected to the input port 411 and the output port 412, respectively. The main coil 410 and the two sub-coils 430 and 420 may be formed as a single coil, and at least one of the size, number of turns, and turn interval of each coil may be controlled. In FIG. 4B, a first sub-coil 440 may be formed into a spire that is larger than the second sub-coil 420. In FIG. 4C, a dependent coil 450 formed in at least one turn may be included inside the first sub-coil 440. This dependent coil 450 may be isolated physically from the second sub-coil 420. The first sub-coil 440 may be different from the second sub-coil 420 in at least one of coil size, the number of turns, and the turn interval.

Figure 5A:
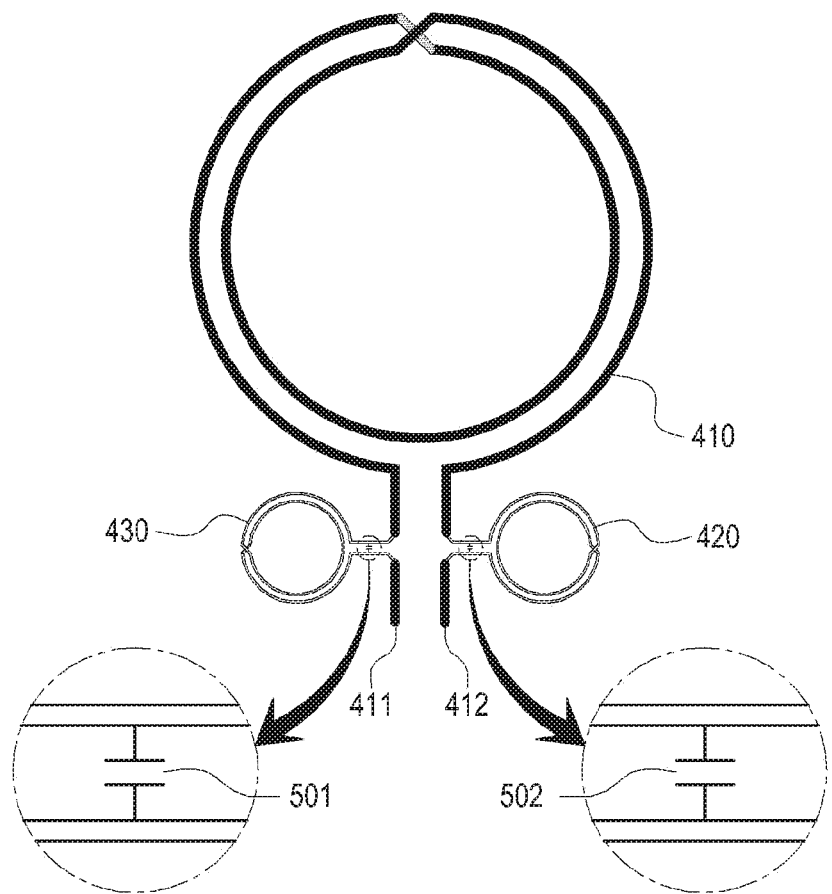
FIG. 5A is an diagram illustrating a capacitor connected to a sub-coil, according to an embodiment of the present disclosure.
Figure 5B:
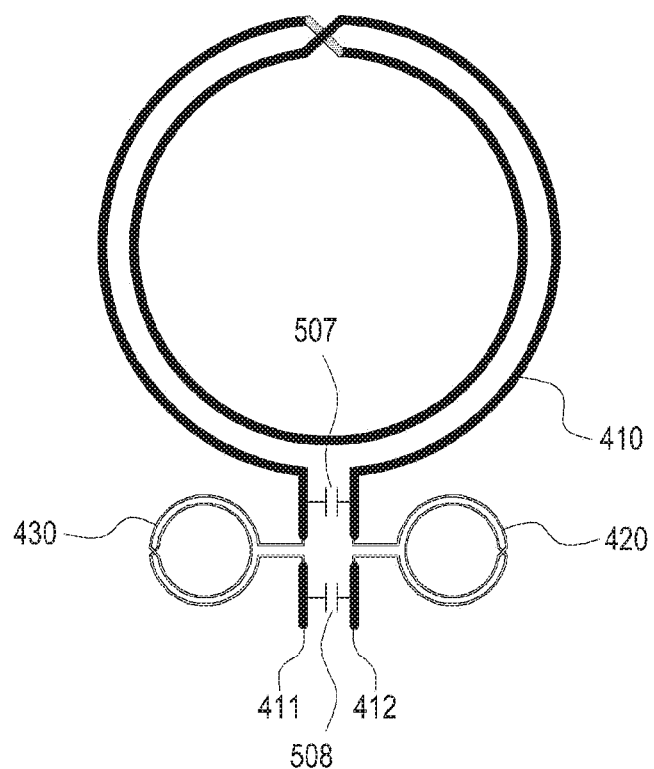
FIG. 5B is a diagram illustrating at least one capacitor connected to a main coil, according to an embodiment of the present disclosure.

FIG. 5A is a diagram illustrating a capacitor connected to a sub-coil, according to an embodiment of the present disclosure. FIG. 5B is a diagram illustrating at least one capacitor connected to a main coil, according to an embodiment of the present disclosure.

According to embodiments of the present disclosure, a matching circuit, a lumped element, a switch device, or the like, is disposed on each coil included in a conductive pattern so that the resonance frequency or magnetic flux distribution of the coil may be controlled. For example, the conductive pattern may include at least one capacitor, at least one variable inter-digital capacitor, or at least one resistor. This conductive pattern includes the main coil 410 formed in a plurality of turns, and the two sub-coils 430 and 420 formed respectively at the input port 411 and the output port of the main coil 410. The two sub-coils 430 and 420 are added respectively to the input port 411 and the output port 412 of the main coil 410 in order to reduce radiation of electromagnetic waves in a high frequency band. The two sub-coils 430 and 420 have a resonance frequency that is the same as or similar to a resonance frequency measured by disposing the main coil 410. These two sub-coils 430 and 420 may be connected serially to the input port 411 and the output port 412, respectively. The main coil 410 and the two sub-coils 430 and 420 may be formed as a single coil, and at least one of the size, number of turns, and turn interval of each coil may be controlled.

Referring to FIG. 5A, capacitors 501 and 502 are connected respectively between input and output ports of the first sub-coil 430 and between input and output ports of the second sub-coil 420. For example, the capacitor 501 is connected in parallel between the input and output ports of the first sub-coil 430, in order to control the resonance frequency of the first sub-coil 430. The capacitor 502 is connected between the input and output ports of the second sub-coil 420, in order to control the resonance frequency of the second sub-coil 420. As the capacitors 501 and 502 are respectively connected in parallel to the first and second sub-coils 430 and 420 in this manner and control the resonance frequency of the main coil 410, radiation of electromagnetic waves from the main coil 410 may be reduced. When power is received wirelessly through a resonance coil, a received analog signal of 6.78 MHz is converted to a DC, generating electromagnetic interference (EMI). The EMI may interfere with wireless power reception, thereby reducing a transmission efficiency. To prevent the decrease of the transmission efficiency, a coil for reducing radiation of electromagnetic waves may be added to the resonance coil and a capacitor may be connected to the coil.

Consequently, the transmission efficiency may be increased. While it has been described that the capacitors 501 and 502 are respectively connected between the input and output ports of the first sub-coil 430 and between the input and output ports of the second sub-coil 420 in FIG. 5A, transmission efficiency may be increased by connecting variable inter-digital capacitors or resistors, instead of capacitors, between the input and output ports of the first sub-coil 430 and between the input and output ports of the second sub-coil 420. The variable inter-digital capacitors may enable device miniaturization and may be configured to be easily included on a transmission line, compared to a conventional multi-layer capacitor formed by arranging conductors in multiple layers with a dielectric material in between.

Referring to FIG. 5B, capacitors 507 and 508 are connected respectively between the input port 411 and the output port 412 of the main coil 410 and between a rear end of the first sub-coil 430 and a front end of the second sub-coil 420. For example, the capacitor 508 may be connected in parallel between the input port 411 and the output port 412 of the main coil 410 in order to control the resonance frequency of the main coil 410. The capacitor 507 may be connected in parallel between the rear end of the first sub-coil 430 and the front end of the second sub-coil 420 in the main coil 410 in order to control the resonance frequency of the main coil 410. Since the resonance frequency is controlled by connecting the two capacitors 507 and 508 in parallel to the main coil 410 with the first and second sub-coils 430 and 420 interposed between the capacitors 507 and 508, radiation of electromagnetic waves from the main coil 410 may be reduced.

While it has been described that the capacitors 507 and 508 are connected between the input port 411 and the output port 412 of the main coil 410 and between the rear end of the first sub-coil 430 and the front end of the second sub-coil 420 in FIG. 5B, transmission efficiency may be increased by connecting variable inter-digital capacitors or resistors, instead of capacitors, between the input port 411 and the output port 412 of the main coil 410 and between the rear end of the first sub-coil 430 and the front end of the second sub-coil 420.

Figure 6A:
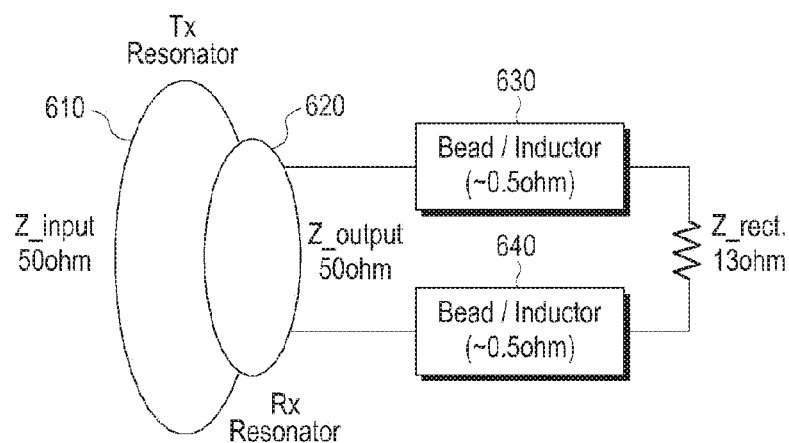
FIG. 6A is a diagram illustrating a bead/coil inductor for reducing radiation of electromagnetic waves to a resonance coil of a reception resonator, according to an embodiment of the present disclosure.
Figure 6B:
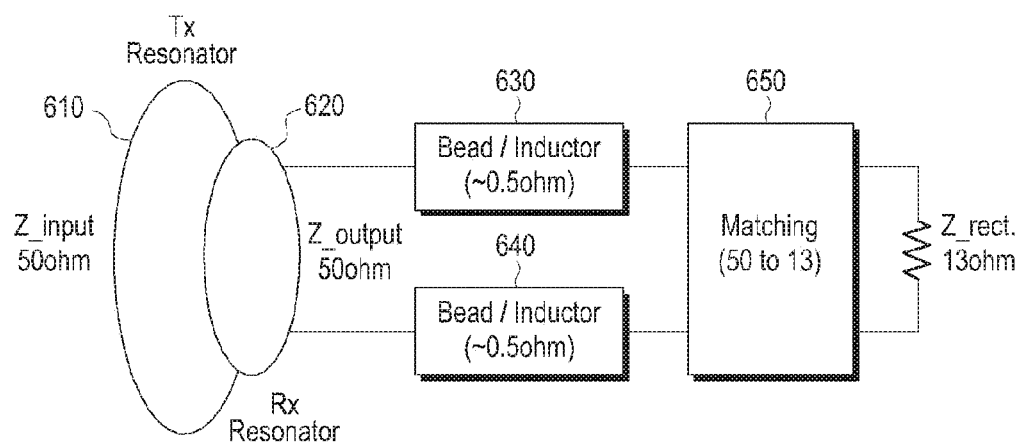
FIG. 6B is a diagram illustrating a bead/coil inductor improved from the bead/coil inductor of FIG. 6A, according to an embodiment of the present disclosure.

FIG. 6A is a diagram illustrating a bead/coil inductor for reducing radiation of electromagnetic waves to a resonance coil of a reception resonator, according to an embodiment of the present disclosure. FIG. 6B is a diagram illustrating a bead/coil inductor improved from the bead/coil inductor illustrated in FIG. 6A, according to an embodiment of the present disclosure.

Referring to FIGS. 6A and 6B, if a coil inductor for reducing radiation of electromagnetic waves is added, the resistance component of the coil inductor may decrease the efficiency of a resonator. As illustrated in FIG. 6A, if each of added coil inductors 630 and 640 has a resistance of, for example, 0.5 ohm, a loss of about 7% may occur. The reason for the loss is that since the output impedance of the reception resonator is low, 14 ohms, the resistance of the coil inductor appears relatively high. To minimized the loss, the loss of the coil inductor may be minimized by increasing the output impedance of the reception resonator, and then may be matched by a matching end 650, as illustrated in FIG. 6B. Therefore, the loss generated from the coil inductors may be decreased to about 2%.

Figure 7:
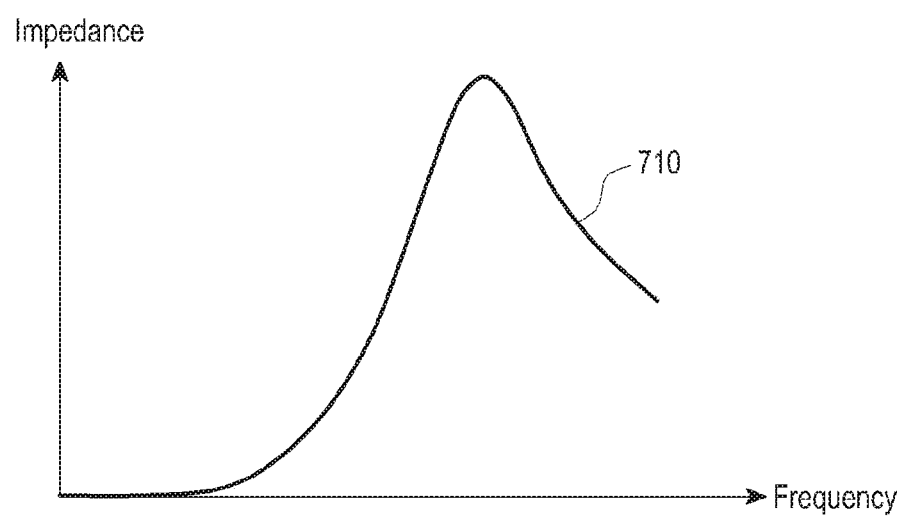
FIG. 7 is a diagram illustrating the impedance property of a sub-coil, according to an embodiment of the present disclosure.

FIG. 7 is a diagram illustrating the impedance property of a sub-coil, according to an embodiment of the present disclosure.

Referring to FIG. 7, the impedance characteristics of a sub-coil, according to embodiments of the present disclosure, may be changed according to a frequency, as denoted by curve 710. The impedance of a coil capable of reducing radiation of electromagnetic waves may increase in a specific band causing resonance. For this reason, signal transmission to a resonance coil receiving wireless power may be prevented, and thus, radiation of electromagnetic waves may be reduced. Since the resonance frequency of a resonance circuit is changed according to the size and number of turns of the coil capable of reducing radiation of electromagnetic waves, radiation characteristics of an intended band may be achieved.

As is apparent from the foregoing description, embodiments of the present disclosure can cancel interference caused by a resonance coil receiving wireless power by adding at least one coil for reducing radiation of electromagnetic waves.

Further, embodiments of the present disclosure can increase power transmission efficiency through a resonance coil by adding at least one device to a resonance circuit.

The term "module", as used herein, may be defined as, for example, a unit of one, or a combination of two or more of hardware, software, and firmware. The term "module" may be used interchangeably with terms such as, for example, "unit", "logic", "logical block", "component", and or "circuit". A module may be the smallest unit of an integrated part or a portion thereof. A module may be the smallest unit for performing one or more functions, or a portion thereof. A module may be implemented mechanically or electronically. For example, a module may include at least one of a known, or to-be-developed, application-specific integrated circuit (ASIC) chip, field-programmable gate array (FPGA), or programmable logic device that perform certain operations.

At least a part of apparatuses (for example, modules or their functions) or methods (for example, operations), according to embodiments of the present disclosure, may be implemented as commands stored in a computer-readable storage medium, in the form of a programming module. When the commands are executed by a processor (for example, the controller 122), one or more processors may execute functions corresponding to the commands. The computer-readable storage medium may be, for example, the storage 125.

The computer-readable medium may include a hard disk, a floppy disk, magnetic media (for example, magnetic tape), optical media (for example, compact disc read-only memory (CD-ROM)), DVD, magneto-optical media (for example, floptical disk), hardware devices (for example, read-only memory (ROM), random access memory (RAM) or flash memory)), and the like. Program instructions may include machine language code that are produced by a compiler or high-level language code that may be executed by a computer using an interpreter. The functionalities of hardware discussed above may be implemented as one or more software modules, and vice versa in order to perform an operation according to embodiments of the present disclosure.

A module or a programming module according to various embodiments may include one or more of the above-described components, may omit a portion thereof, or may include additional components. Operations that are performed by a module, a programming module, or other components, according to the present disclosure, may be processed in a serial, parallel, repetitive, or heuristic manner.

Also, some operations may be performed in a different order or omitted, or additional operations may be added.

While the disclosure has been shown and described with reference to certain embodiments thereof, it will be understood by those skilled in the art that various changes in form and detail may be made therein without departing from the spirit and scope of the disclosure as defined by the appended claims.

What is claimed is:

1. An electronic device comprising:
a housing;
a rectifier configured to rectify power provided through a first port and a second port of a power receiving circuit; and
the power receiving circuit disposed within the housing and including a conductive pattern for wirelessly receiving the power, the conductive pattern comprising:
a main coil,
a first sub-coil, wherein a first end of the first sub-coil is connected to a first end of the main coil and a second end of the first sub-coil is connected to the first port, and
a second sub-coil, wherein a first end of the second sub-coil is connected to a second end of the main coil and a second end of the second sub-coil is connected to the second port.

2. The electronic device of claim 1, wherein each of the first sub-coil and the second-sub-coil has a resonance frequency similar to a resonance frequency measured after the main coil is disposed, the first sub-coil is connected serially to the first port, and the second sub-coil is connected serially to the second port.

3. The electronic device of claim 2, wherein the first end and the second end of the first sub-coil are connected to a first capacitor, and the first end and the second end of the second sub-coil are connected to a second capacitor for controlling a resonance frequency.

4. The electronic device of claim 2, wherein the first end and the second end of the first sub-coil are connected to a first variable inter-digital capacitor, and the first end and the second end of the second sub-coil are connected to a second variable inter-digital capacitor, for controlling a resonance frequency.

5. The electronic device of claim 2, wherein the first end and the second end of the first sub-coil are connected to a first resistor, and the first end and the second end of the second sub-coil are connected to a second resistor, for controlling a resonance frequency.

6. The electronic device of claim 1, wherein each of the first sub-coil and the second sub-coil comprises at least two turns, and the first sub-coil is shaped into a spire that is larger than the second sub-coil.

7. The electronic device of claim 6, wherein the first sub-coil is different from the second sub-coil in at least one of size, number of turns, and turn interval.

8. The electronic device of claim 6, wherein:
a dependent coil is formed within the first sub-coil,
wherein the dependent coil comprises at least two turns, and
the dependent coil is not connected to the first sub-coil.

9. The electronic device of claim 1, wherein the first port and the second port are connected to a first capacitor and a second capacitor for controlling a resonance frequency.

10. The electronic device of claim 9, wherein the first capacitor is connected in parallel to the first end of the first sub-coil and the first end of the second sub-coil, and the second capacitor is connected in parallel to the second end of the first sub-coil and the second end of the second sub-coil.

11. The electronic device of claim 1, wherein the first port and the second port of the main coil are connected to a first variable inter-digital capacitor and a second variable inter-digital capacitor for controlling a resonance frequency.

12. The electronic device of claim 11, wherein the first variable inter-digital capacitor is connected in parallel to the first end of the first sub-coil and the first end of the second sub-coil, and the second variable inter-digital capacitor is connected in parallel to the second end of the first sub-coil and the second end of the second sub-coil.

13. The electronic device of claim 1, wherein the main coil, the first sub-coil, and the second sub-coil are wound in the same direction.

14. The electronic device of claim 1, wherein the controller is further configured to sense radiation of electromagnetic waves generated during conversion of the power to direct current.

15. The electronic device of claim 14, wherein the first sub-coil and the second sub-coil are formed at positions at which the radiation of the generated electromagnetic waves is minimized.

* * * * *